United States Patent
Liu et al.

(10) Patent No.: US 12,523,619 B2
(45) Date of Patent: Jan. 13, 2026

(54) METHOD AND DEVICE OF INSPECTING SURFACE OF INTERCONNECT STRUCTURE

(71) Applicant: CHENG MEI INSTRUMENT TECHNOLOGY CO., LTD., Hsinchu County (TW)

(72) Inventors: Chin-Yu Liu, Hsinchu County (TW); Chih-Yuan Lin, Hsinchu County (TW); Hung-Chun Lo, Hsinchu County (TW); Chao-Yu Huang, Hsinchu County (TW); Chun-Pin Hsu, Hsinchu County (TW); Cheng-Tao Tsai, Hsinchu County (TW)

(73) Assignee: CHENG MEI INSTRUMENT TECHNOLOGY CO., LTD., Hsinchu County (TW)

( * ) Notice: Subject to any disclaimer, the term of this patent is extended or adjusted under 35 U.S.C. 154(b) by 154 days.

(21) Appl. No.: 18/604,508

(22) Filed: Mar. 14, 2024

(65) Prior Publication Data
US 2025/0216340 A1    Jul. 3, 2025

(30) Foreign Application Priority Data
Dec. 27, 2023    (TW) .................... 112151177

(51) Int. Cl.
*G01N 21/956*    (2006.01)
*G01N 21/21*    (2006.01)
(Continued)

(52) U.S. Cl.
CPC ....... *G01N 21/95684* (2013.01); *G01N 21/21* (2013.01); *G01N 21/9501* (2013.01); *G01N 21/956* (2013.01); *G01N 2021/8848* (2013.01)

(58) Field of Classification Search
CPC . G01N 2021/8848; G01N 2021/95646; G01N 2021/8438; G01N 2021/217;
(Continued)

(56) References Cited

U.S. PATENT DOCUMENTS 7,006,224 B2 *    2/2006  Some ................ G01N 21/9501
                                                      356/369
9,322,771 B2 *    4/2016  Son ........................ G01N 21/33
(Continued)

FOREIGN PATENT DOCUMENTS

WO    WO-0240976 A2 *    5/2002    ......... G02B 21/0016
WO    WO-2025113927 A1 *    6/2025    ........... G01N 21/956

*Primary Examiner* — Gordon J Stock, Jr.
(74) *Attorney, Agent, or Firm* — WPAT, P.C.; Anthony King

(57) ABSTRACT

A method and device of inspecting a surface of an interconnect structure are provided. The interconnect structure includes a first metal layer, second metal layer, and dielectric layer enclosing the second metal layer. The first metal layer and dielectric layer are disposed above the second metal layer. At least one portion of the first metal layer is exposed from the surface of the interconnect structure. The method includes: illuminating a surface of an interconnect structure by an incident light having a first polarization state; receiving light signals reflected from the interconnect structure and having a second polarization state different from the first polarization state; and determining a planar pattern of the first metal layer by differentiating between at least one light signal reflected from the first metal layer and at least one light signal reflected from the second metal layer according to intensity differences between the light signals.

20 Claims, 9 Drawing Sheets

(51) Int. Cl.
*G01N 21/88* (2006.01)
*G01N 21/95* (2006.01)

(58) Field of Classification Search
CPC ... G01N 2021/8809; G01N 2021/8822; G01N 2021/8825; G01N 2021/8845; G01N 21/9501; G01N 21/95646; G01N 21/95684; G01N 21/01; G01N 21/17; G01N 21/88; G01N 21/956; G01N 21/8422; G01N 21/21; G01N 21/8803; G01N 21/8806
See application file for complete search history.

(56) References Cited

U.S. PATENT DOCUMENTS

| | | | |
|---|---|---|---|
| 11,631,169 B2* | 4/2023 | Luo | G06T 7/0006 |
| | | | 382/149 |
| 12,300,556 B2* | 5/2025 | Hsu | H01L 22/12 |
| 2004/0125375 A1* | 7/2004 | Some | G01N 21/9501 |
| | | | 356/369 |
| 2005/0190259 A1* | 9/2005 | Mitsuhashi | H04N 9/47 |
| | | | 348/87 |
| 2017/0150104 A1* | 5/2017 | Koren | G06T 3/14 |
| 2017/0344697 A1* | 11/2017 | Postolov | G03F 7/70616 |
| 2020/0279775 A1* | 9/2020 | Ben Ezer | H01L 22/24 |
| 2025/0285895 A1* | 9/2025 | Lee | G01N 21/9501 |

\* cited by examiner

METHOD AND DEVICE OF INSPECTING SURFACE OF INTERCONNECT STRUCTURE

CROSS-REFERENCE TO RELATED APPLICATIONS

This application claims priority of Taiwan application No. 112151177, filed on Dec. 27, 2023, which is incorporated by reference in its entirety.

BACKGROUND OF THE PRESENT DISCLOSURE

Field of the Present Disclosure

The present disclosure relates to a method of inspecting the surface of an object, and more particularly to a method of inspecting the surface of an interconnect structure with polarization light.

Description of the Prior Art

A redistribution layer (RDL) is included in an integrated circuit (IC) and comprises wirings for interconnecting components/conductors at different positions in the integrated circuit. For instance, in wafer-level packaging (WLP), a redistribution layer is usually included in an integrated circuit to connect input/output ends narrowly distributed across the integrated circuit to solder pads or solder balls widely distributed on packaged dies. In general, a redistribution layer comprises metal layers located on multiple planes, and each metal layer comprises multiple metal wirings spaced apart from each other by dielectric layers.

Top-layer metal of a redistribution layer has to be inspected during the manufacturing process to detect short circuits, open circuits or deformations so as to ensure the quality of the redistribution layer. However, during the inspection of the top-layer metal of the redistribution layer, light rays penetrate the dielectric layers and become incident on the underlying-layer metal, because the dielectric layers are made of materials with high transmittance, such as polyimide (PI); as a result, the intensity of the reflecting lights reflected from the underlying-layer metal equals the intensity of the reflecting lights reflected from the top-layer metal, rendering it difficult to discriminate between the distribution of the top-layer metal and the distribution of the underlying-layer metal. Therefore, it is imperative to effectively discriminate between the top-layer metal and the underlying-layer metal and thereby accurately inspect the distribution of the top-layer metal.

SUMMARY OF THE PRESENT DISCLOSURE

An embodiment of the disclosure provides a method of inspecting a surface of an interconnect structure. The interconnect structure comprises a first metal layer, a second metal layer, and a dielectric layer enclosing the second metal layer. The first metal layer and the dielectric layer are disposed above the second metal layer, and at least one portion of the first metal layer is exposed from the surface of the interconnect structure. The method of inspecting a surface of an interconnect structure comprises the steps of: illuminating a surface of an interconnect structure by an incident light having a first polarization state; receiving a plurality of light signals reflected from the interconnect structure and having a second polarization state different from the first polarization state; and determining a planar pattern of the first metal layer by differentiating between at least one light signal reflected from the first metal layer and at least one light signal reflected from the second metal layer according to intensity differences between the light signals.

Another embodiment of the disclosure provides a device of inspecting a surface of an interconnect structure. The device comprises a polarization light source, analyzer, sensor and controller. The polarization light source generates an incident light with a first polarization state so as for the incident light to illuminate a surface of an interconnect structure. The interconnect structure comprises a first metal layer, a second metal layer, and a dielectric layer enclosing the second metal layer. The first metal layer and the dielectric layer are disposed above the second metal layer. At least one portion of the first metal layer is exposed from the surface of the interconnect structure. The analyzer receives a reflecting light reflected from the interconnect structure and allows a plurality of light signals having a second polarization state different from the first polarization state to pass through. The sensor receives the light signals. The controller is coupled to the sensor and configured to differentiate between at least one light signal reflected from the first metal layer and at least one light signal reflected from the second metal layer according to intensity differences of the light signals so as to determine a planar pattern of the first metal layer.

Another embodiment of the disclosure provides a method of inspecting a surface of an interconnect structure, the interconnect structure comprising a first metal layer, a second metal layer, and a dielectric layer enclosing the second metal layer. The first metal layer and the dielectric layer are disposed above the second metal layer, and the first metal layer has at least a portion thereof exposed from the surface of the interconnect structure. The method comprises the steps of: adjusting polarization angles of a polarizer and an analyzer; generating an incident light, from a light source through the polarizer, to illuminate the interconnect structure, wherein the incident light has a first polarization state; receiving a plurality of light signals reflected from the interconnect structure and passing through the analyzer, wherein the light signals have a second polarization state different from the first polarization state; and differentiating between at least one light signal reflected from the first metal layer and at least one light signal reflected from the second metal layer according to intensity differences of the light signals so as to determine a planar pattern of the first metal layer.

In the embodiments of the disclosure, the method and device of inspecting a surface of an interconnect structure have advantages as follows: owing to the depolarization effect of the reflection taking place on a surface metal layer and an inner metal layer of the interconnect structure, the polarization state of reflecting lights reflected from the two metal layers is different from the polarization state of incident lights incident on the two metal layers; owing to the difference in the reflection environment between the two metal layers, there is a discernible difference in the intensity between the light signals embodied in the reflecting lights reflected from the two metal layers and having the second polarization state, rendering it feasible to determine whether the light signals reflect off the surface metal layer or the inner metal layer according to the difference. Therefore, the method and device are effective in determining the planar pattern of a metal layer located on the surface of the interconnect structure and precluding any wrong determination which might otherwise occur because of the failure to differentiate between the reflecting lights reflected from a surface metal layer and the reflecting lights reflected from an inner metal layer.

DETAILED DESCRIPTION OF THE EMBODIMENTS

Figure 1:
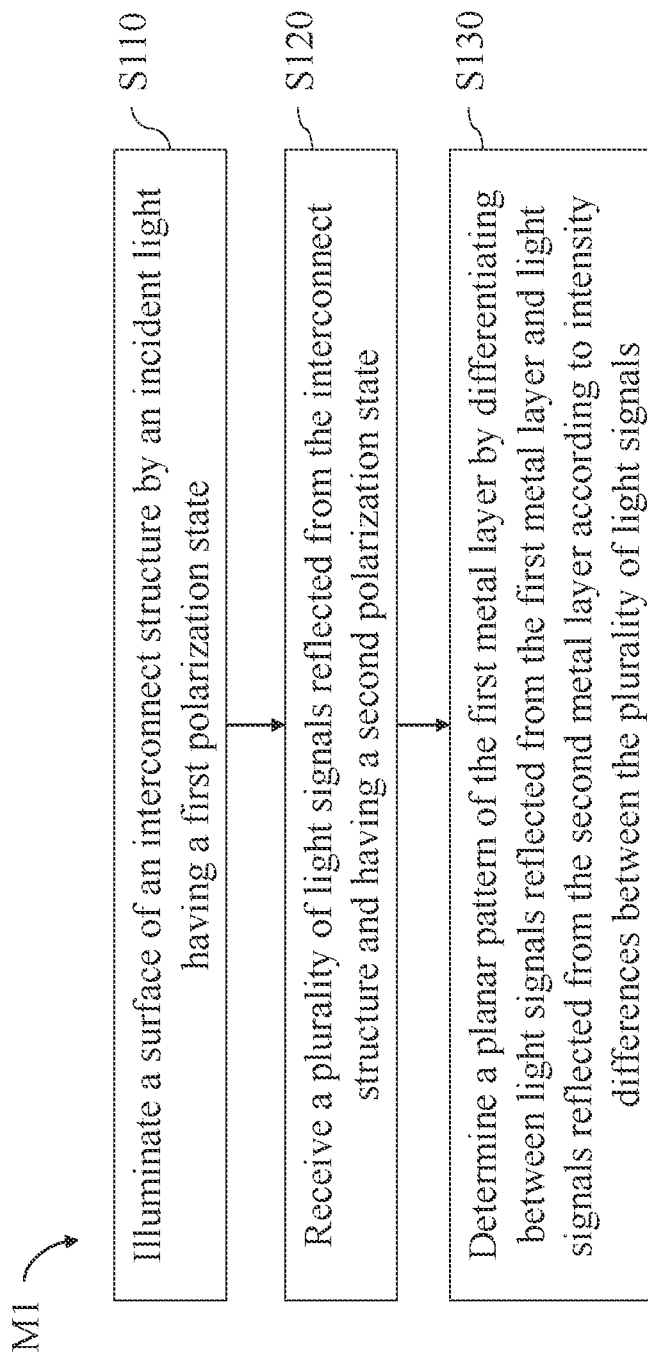
FIG. 1 is a schematic view of a process flow of a method of inspecting a surface of an interconnect structure according to an embodiment of the disclosure.
Figure 2:
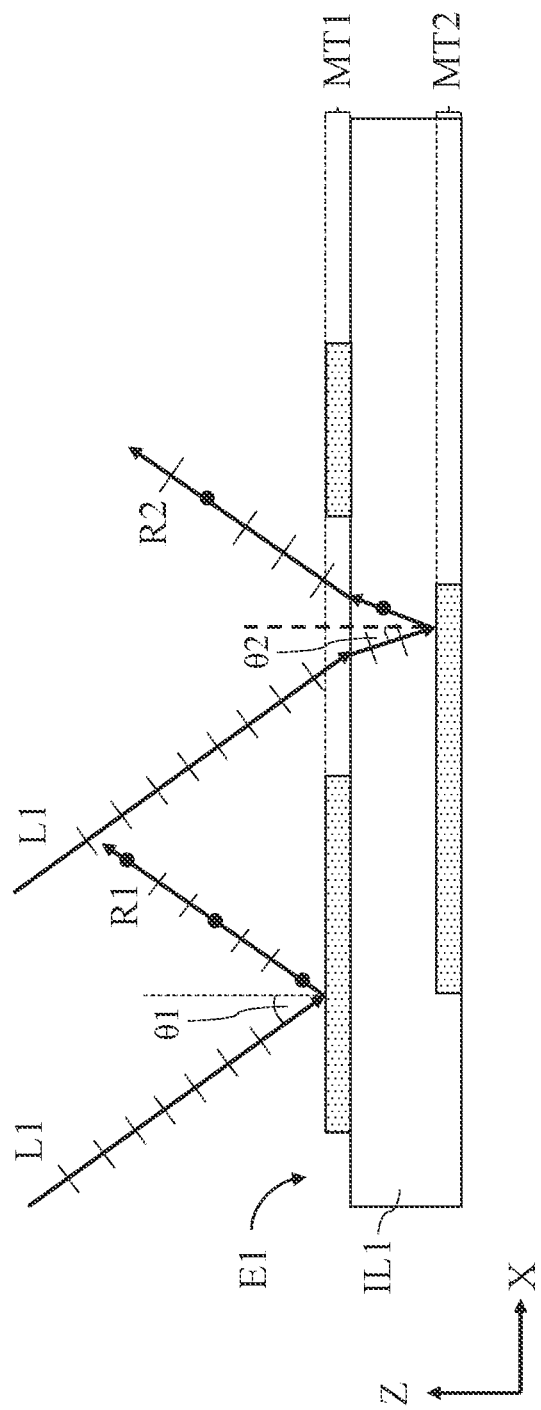
FIG. 2 is a schematic view of how to apply the method of inspecting the interconnect structure according to an embodiment of the disclosure.

FIG. 1 is a schematic view of a process flow of a method M1 of inspecting a surface of an interconnect structure according to an embodiment of the present disclosure. FIG. 2 is a schematic view of how to apply the method M1 to inspecting an interconnect structure E1 according to an embodiment of the present disclosure. In the present embodiment, the method M1 comprises step S110 through step S130 and is applicable to inspecting the surface of the interconnect structure E1. The interconnect structure E1 of the present disclosure comprises, but is not limited to, a printed circuit board, a semiconductor substrate or carrier, an interposer, a semiconductor chip or a redistribution layer (RDL) for use in packaging, or any other structure that provides lamination wirings.

As shown in FIG. 2, the interconnect structure E1 comprises metal layers MT1, MT2 and dielectric layer IL1. The metal layer MT2 comprises multiple wirings. The dielectric layer IL1 is disposed above the metal layer MT2 and encloses the metal layer MT2 to space apart different wirings in the metal layer MT2. The metal layer MT1 comprises multiple wirings and has at least a portion exposed from the surface of interconnect structure E1. The metal layer MT1 is disposed above the metal layer MT2 and dielectric layer IL1. Thus, the wirings in the metal layer MT1 are spaced apart from the wirings in the metal layer MT2 by the dielectric layer IL1. In some embodiments, a wiring (not shown in FIG. 2) is connected longitudinally (for example, in direction Z) between the metal layer MT1 and metal layer MT2, allowing the metal layer MT1 to pass through the dielectric layer IL1 and thus electrically connect to the metal layer MT2. In the present embodiment, the method M1 can be used for inspecting the surface of the interconnect structure E1.

In step S110, the interconnect structure E1 is illuminated by incident lights L1 that have a first polarization state. As shown in FIG. 2, some incident lights L1 are incident on the metal layer MT1, and some incident lights L1 may penetrate the dielectric layer IL1 and then fall on the metal layer MT2 below. In the present embodiment, due to the depolarization characteristics of metals, when the metal layer MT1 reflects the incident lights L1 having the first polarization state, the metal layer MT1 may change the polarization state of some of the incident lights L1, causing some of reflecting lights R1 to have the first polarization state while others to have a second polarization state different from the first polarization state. Similarly, some of reflecting lights R2 reflected from the metal layer MT2 have the first polarization state while others have the second polarization state.

In the present embodiment, the first polarization state has a polarization direction parallel to a plane of incidence (i.e., a plane defined by the incident lights L1 and the reflecting lights R1, R2, for example, the X-Z plane), for example, the P polarization state (in FIG. 2, the P polarization direction that is parallel to the plane of incidence is indicated by a dashed line), and the second polarization state has a polarization direction perpendicular to the plane of incidence, for example, the S polarization state (in FIG. 2, the S polarization direction that is perpendicular to the plane of incidence is indicated by a dot). However, the disclosure is not limited thereto. In some embodiments, the first polarization state can be the S polarization state, and the second polarization state can be the P polarization state.

The depolarization characteristics of metals vary with the degree of roughness of the metal surfaces, the angle of incidence of the incident lights, and the wavelength of the incident lights; thus, the depolarization ratio of the metal layer MT1 is different from the depolarization ratio of the metal layer MT2. That is, intensity of light signals that are reflected from the metal layer MT1 and have the second polarization state should be different from intensity of light signals that are reflected from the metal layer MT2 and have the second polarization state. In such case, after a plurality of light signals that are reflected from the interconnect structure E1 and have the second polarization state have been received in step S120, the planar pattern of the metal layer MT1 can be determined by differentiating between light signals reflected from the metal layer MT1 and light signals reflected from the metal layer MT2 according to intensity differences of the received light signals in step S130.

For instance, when the depolarization ratio of the metal layer MT1 is greater than the depolarization ratio of the metal layer MT2, the intensity of the light signals reflected from the metal layer MT1 and having the second polarization state would be greater than the intensity of the light signals reflected from the metal layer MT2 and having the second polarization state. As shown in FIG. 2, comparatively, the dots indicative of the second polarization state direction in the reflecting lights R1 are densely distributed, but the dots indicative of the second polarization state direction in the reflecting lights R2 are sparsely distributed.

In some embodiments, when the intensity of a first light signal (for example, a part of the reflecting lights R1 that has the second polarization state) is greater than the intensity of a second light signal (for example, a part of the reflecting lights R2 that has the second polarization state), it can be determined that the first light signal is reflected from the metal layer MT1 and that the second light signal is reflected from the metal layer MT2; however, the present disclosure is not limited thereto. In some embodiments, a threshold can be set as needed. In such case, when the intensity of the first light signal is greater than the threshold, it can be determined that the first light signal is reflected from the metal layer MT1 located on the surface of the interconnect structure E1, whereas, when the intensity of the second light signal is less than the threshold, it can be determined that the second light signal is reflected from the metal layer MT2 located inside the interconnect structure E1.

Figure 3:
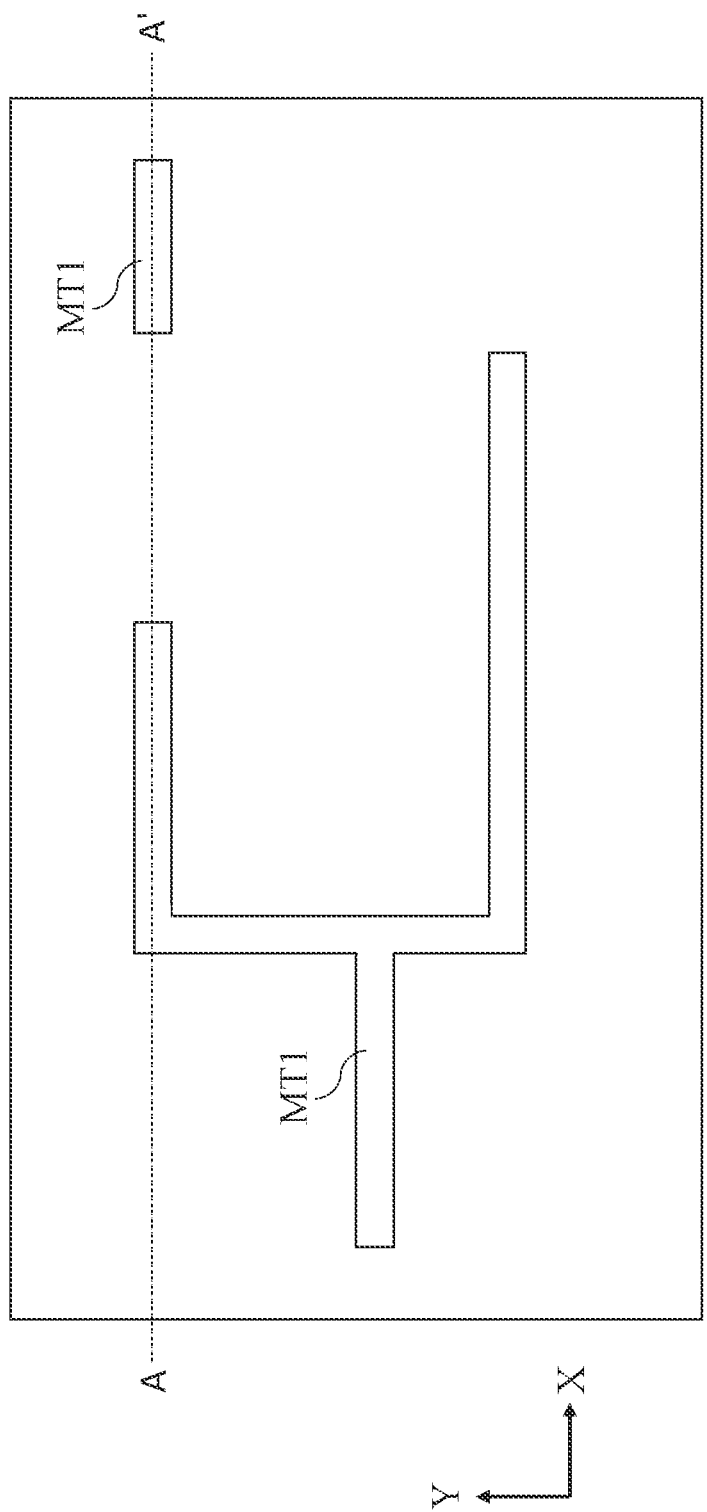
FIG. 3 is a schematic view of a surface metal layer planar pattern of the interconnect structure of FIG. 2 according to an embodiment of the disclosure.
Figure 4:
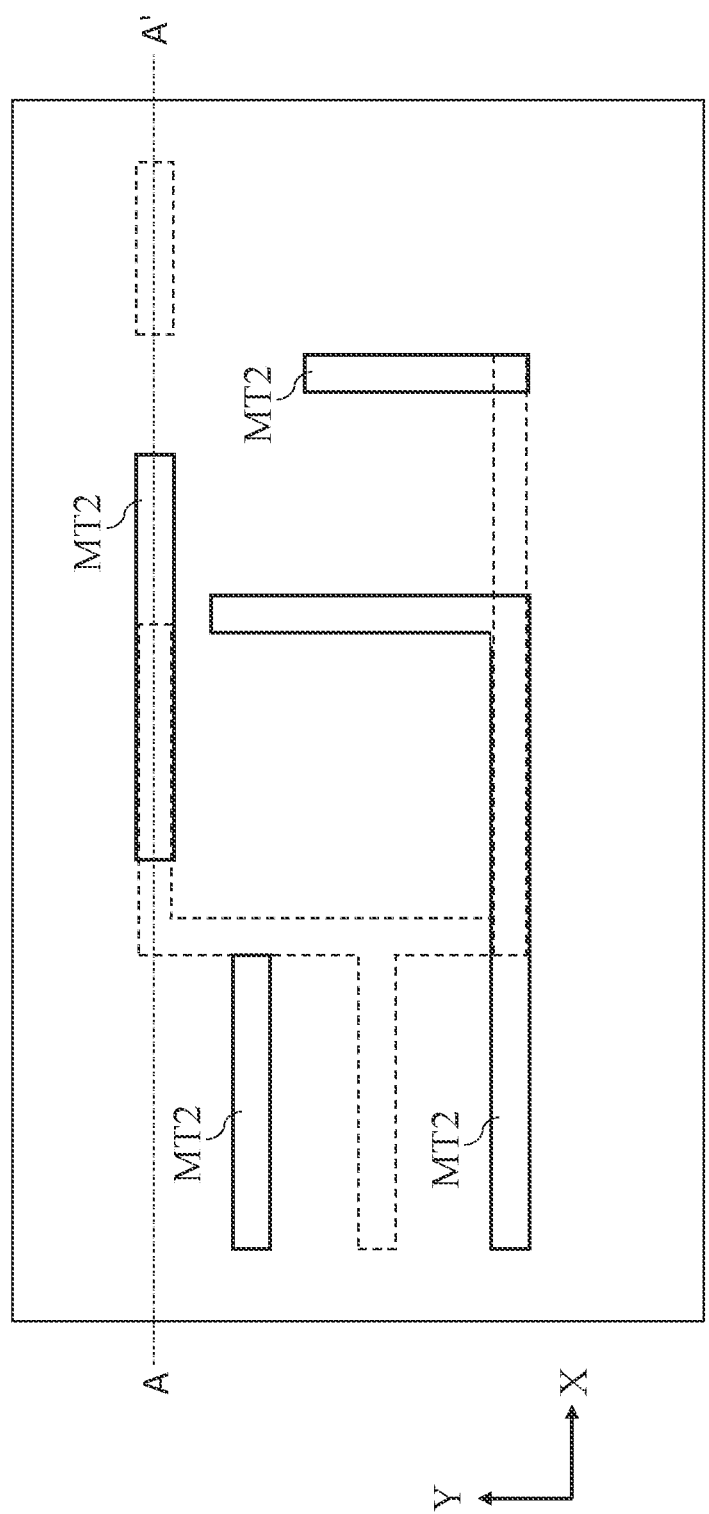
FIG. 4 is a schematic view of an inner metal layer planar pattern of the interconnect structure of FIG. 2 according to an embodiment of the disclosure.
Figure 5:
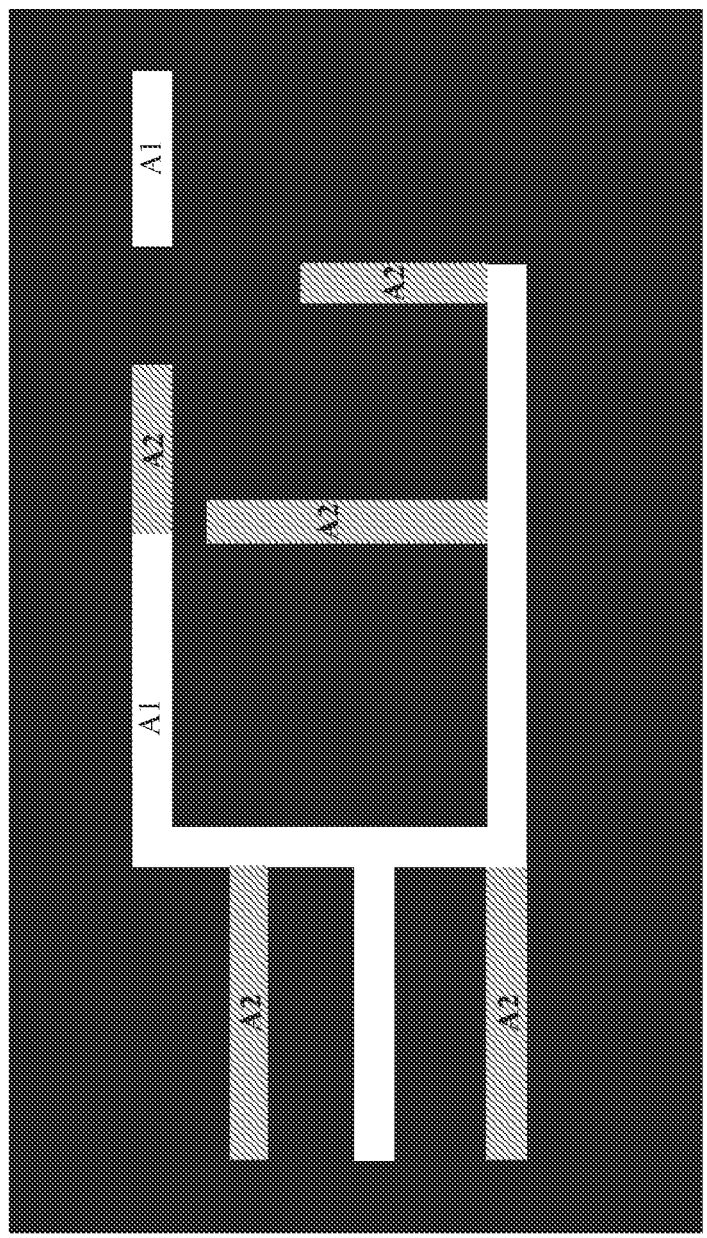
FIG. 5 is a schematic view of light signals reflected from the interconnect structure, having a second polarization state, and received upon execution of the steps of FIG. 1.

FIG. 3 schematically depicts a planar pattern of a surface metal layer MT1 of the interconnect structure E1 according to an embodiment of the present disclosure. FIG. 4 schematically depicts a planar pattern of an inner metal layer MT2 of the interconnect structure E1 according to an embodiment of the present disclosure. Referring to FIG. 4, dashed lines demarcate the planar pattern of the metal layer MT1. By comparing FIG. 3 and FIG. 4, it can be seen that a portion of the planar pattern of the metal layer MT1 overlaps a portion of the planar pattern of the metal layer MT2, and a portion of the planar pattern of the metal layer MT2 extends outward from the planar pattern of the metal layer MT1. FIG. 5 is a schematic view of execution of step S120 for receiving light signals reflected from the interconnect structure E1 and having the second polarization state. In the present embodiment, FIG. 2 is a cross-sectional view of the interconnect structure E1 derived by cutting along the line A-A' of FIG. 3 and FIG. 4. Referring to FIG. 5, the white area A1 is the area that receives reflecting light signals of higher intensity (for example, the intensity is greater than the threshold), and the shaded area A2 is the area that receives reflecting light signals of lower intensity (for example, the intensity is less than the threshold). In the present embodiment, the light source that generates the incident lights L1 is a dark-field light source, and thus the black background in FIG. 5 is the area where no reflecting lights are received.

In this situation, since the intensity of the light signals received in the white area A1 is higher than the intensity of light signals received in the shaded area A2, it can be determined that the light signals in the white area A1 are reflected from the metal layer MT1 while the light signals in the shaded area A2 are not reflected from the metal layer MT1. Therefore, in step S130, it can be determined that the white area A1 is the planar pattern of the metal layer MT1.

In other words, the method M1 can let portions of the reflecting lights R1 and R2 have a polarization state (e.g., the second polarization state) different from the polarization state of the incident lights L1 (e.g., the first polarization state) by taking the advantage of the depolarization effects of the reflection taking place on the surfaces of the metal layers MT1 and MT2, and let the light signals that have the second polarization state in the reflecting lights R1 and R2 have distinguishable intensity differences by providing different reflection environments for the metal layers MT1 and MT2, rendering it possible to differentiate between the light signals reflected from the metal layer MT1 on the surface and the light signals reflected from the metal layer MT2 in the interior according to the difference. Therefore, the method M1 is effective in determining the planar pattern of the metal layer MT1 located on the surface of the interconnect structure E1 and reducing wrong determinations which might otherwise occur because of the failure to differentiate between the reflecting lights reflected from the metal layer MT1 and the reflecting lights reflected from the metal layer MT2.

In some embodiments, the refractive index of the dielectric layer IL1 is greater than the refractive index of the environment in contact with the surface of the interconnect structure E1. For instance, when the interconnect structure E1 is placed in air, the refractive index of the dielectric layer IL1 is greater than the refractive index of air, and thus the refractive index of the dielectric layer IL1 can be greater than 1. In such case, since the incident lights L1 undergo refraction in the dielectric layer IL1 before being incident on the metal layer MT2, the angle of incidence $\theta 2$ at which the incident lights L1 are incident on the metal layer MT2 is less than the angle of incidence $\theta 1$ at which the incident lights L1 are incident on the metal layer MT1. In this situation, the difference between the angles of incidence at which the incident lights L1 are incident on metal layer MT1 and the metal layer MT2 further increases the difference in the depolarization ratio between the metal layer MT1 and the metal layer MT2, thereby enhancing the accuracy in determining the planar pattern of the surface metal layer MT1.

In some embodiments, the dielectric layer IL1 is made of material(s) including, for example, polyimide (PI), but the disclosure is not limited thereto. In some other embodiments, the dielectric layer IL1 is made of any other appropriate material to increase the difference between the intensity of a light signal reflected from the metal layer MT1 and having the second polarization state and the intensity of a light signal reflected from the metal layer MT2 and having the second polarization state so as to enhance the accuracy in determining the planar pattern of the metal layer MT1.

In some embodiments, the metal layers MT1 and MT2 are made of material(s) including, for example, copper, but the present disclosure is not limited thereto. In some other embodiments, the metal layers MT1 and MT2 are made of any other appropriate metal, for example, any one of gold, silver, aluminum, nickel, tin and platinum or an alloy thereof as needed to increase the difference between the intensity of the light signal reflected from the metal layer MT1 and having the second polarization state and the intensity of the light signal reflected from the metal layer MT2 and having the second polarization state so as to enhance the accuracy in determining the planar pattern of the metal layer MT1.

In some embodiments, the dark-field light source for generating the incident lights L1 comprises one or more wavelengths, for example, comprises visible light or UV, and can illuminate the interconnect structure E1 by mixing light at multiple angles. In some embodiments, the wavelength and the angle of incidence of the incident lights L1 are adjusted to further increase the difference between the intensity of the light signal reflected from the metal layer MT1 and having the second polarization state and the intensity of the light signal reflected from the metal layer MT2 and having the second polarization state so as to enhance the accuracy in determining the planar pattern of the surface metal layer MT1.

For instance, in some embodiments, an experimental test is performed to select an appropriate wavelength of the incident lights L1 and thereby maximize the difference between the intensity of the light signal reflected from the metal layer MT1 and having the second polarization state and the intensity of the light signal reflected from the metal layer MT2 and having the second polarization state so as to enhance the accuracy in determining the planar pattern of the metal layer MT1 using the method M1.

Furthermore, in some embodiments, the characteristics of Brewster angle are conducive to the reduction of the intensity of the incident lights entering the dielectric layer IL1 so as to increase the difference between the intensity of a light signal reflected from the metal layer MT1 and having the second polarization state and the intensity of a light signal reflected from the metal layer MT2 and having the second polarization state. When the incident light enters a second medium from a first medium at the Brewster angle, a portion of the incident lights that have a polarization direction perpendicular to the plane of incidence defined by the incident lights and reflecting lights would be reflected at the second medium; thus, only some of the light signals having the perpendicular polarization state are able to enter the second medium.

Figure 6:
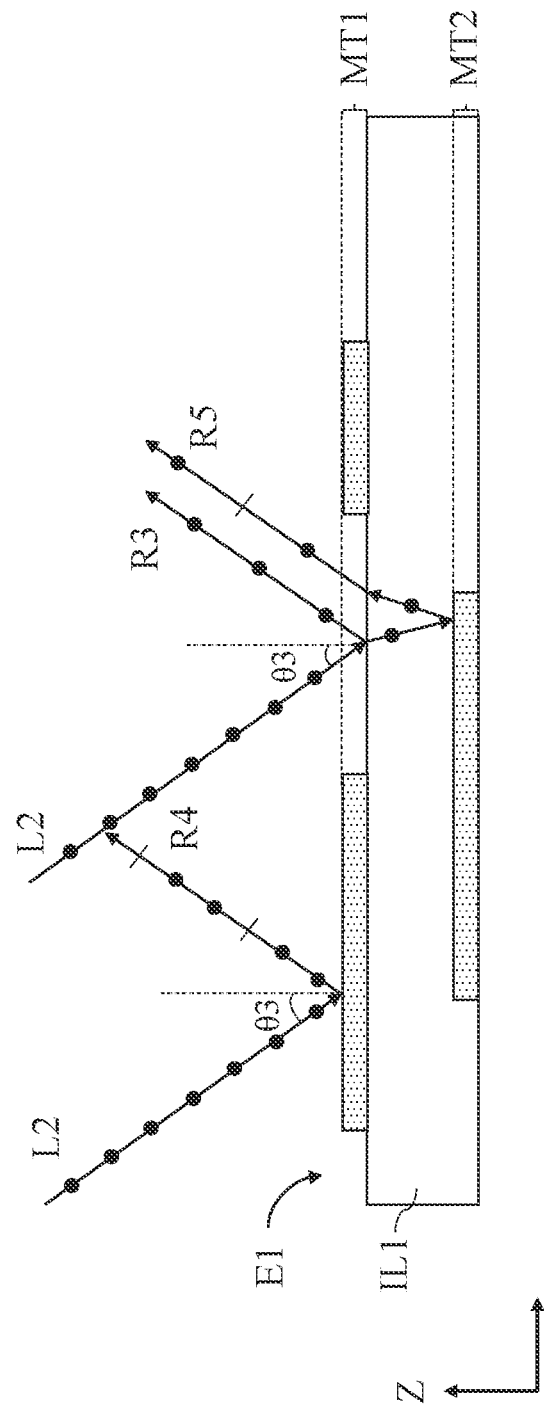
FIG. 6 is another schematic view of how to inspect the interconnect structure of FIG. 2 with the method of FIG. 1 according to an embodiment of the disclosure.

FIG. 6 is another schematic view of how to inspect the interconnect structure E1 with the method M1 according to an embodiment of the disclosure. As shown in FIG. 6, the incident lights L2 have S polarization state (denoted by dots shown in FIG. 6), and thus their polarization direction is perpendicular to the plane of incidence defined by the incident lights L2 and the reflecting lights R1 and R2. In such case, when the incident lights L2 are incident on the interconnect structure E1 at the Brewster angle θ3 of the dielectric layer IL1, most of the incident lights L2 will be reflected by the dielectric layer IL1 (for example, a reflecting light R3), and thus the intensity of the incident lights L2 that incident on the metal layer MT2 lessens. In such case, the intensity of the light signals having the P polarization state (indicated by dashed lines in FIG. 6) and generated because of the depolarization characteristics during the reflection taking place on the metal layer MT2 also lessens. Therefore, the intensity of the light signals having the P polarization state and embodied in a reflecting light R4 reflected from the metal layer MT1 would be significantly greater than the intensity of the light signals having the P polarization state and embodied in a reflecting light R5 reflected from the metal layer MT2. Therefore, the difference between the intensity of the light signals having P polarization state and reflected from the metal layer MT1 and the intensity of the light signals having P polarization state and reflected from the metal layer MT2 further increases so that the accuracy in determining the planar pattern of the metal layer MT1 can be enhanced.

Figure 7:
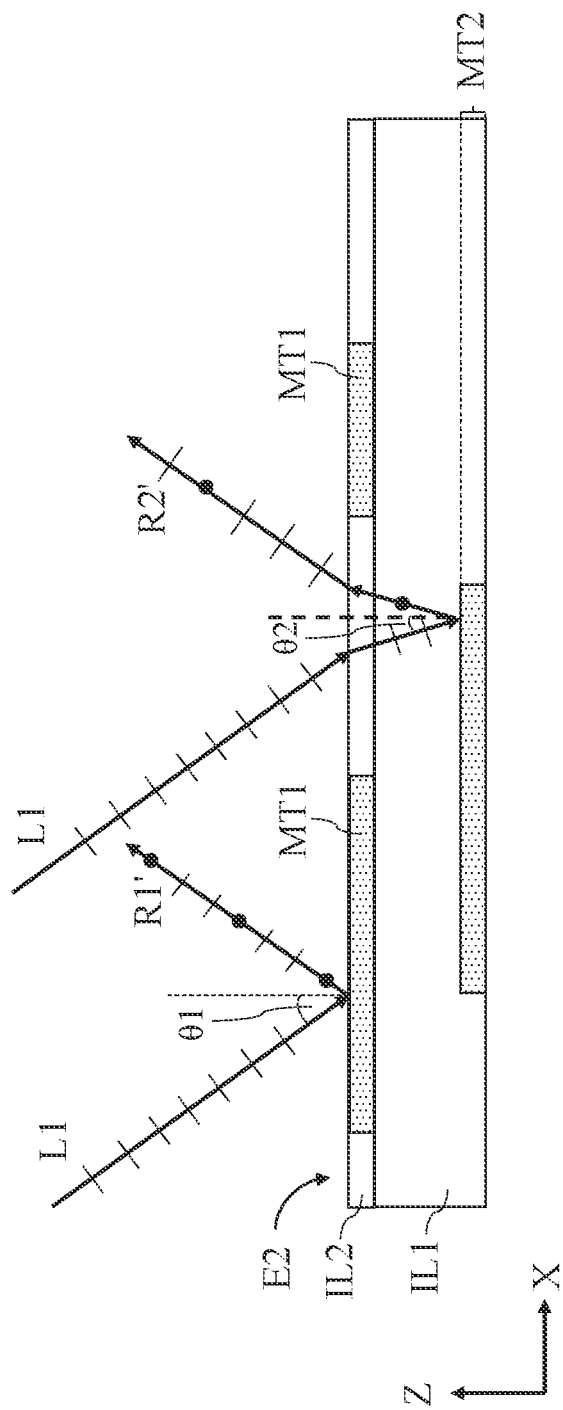
FIG. 7 is a schematic view of how to inspect another interconnect structure with the method of FIG. 1 according to an embodiment of the disclosure.

FIG. 7 is a schematic view of how to inspect another interconnect structure E2 with the method M1 according to an embodiment of the disclosure. In the embodiment illustrated by FIG. 7, the interconnect structure E2 is different from the interconnect structure E1 in that the interconnect structure E2 further comprises another dielectric layer IL2 disposed above the dielectric layer IL1 and enclosing the metal layer MT1 to space apart multiple wirings in the metal layer MT1. In the embodiment illustrated by FIG. 7, the surface of the dielectric layer IL2 is flush with the surface of the metal layer MT1, and a portion of the metal layer MT1 is still exposed from the surface of the interconnect structure E2. In this situation, the planar pattern of the metal layer MT1 can still be inspected with the method M1. As shown in FIG. 7, the surface of the interconnect structure E2 can be illuminated by incident lights L1 having the first polarization state (step S110), and some of the incident lights L1 are incident on the metal layer MT1, whereas some of the incident lights L1 penetrate the dielectric layers IL1 and IL2 and are incident on the metal layer MT2. In such case, the light signals of parts of the reflecting lights R1' and R2' that are reflected from the metal layer MT1 and the metal layer MT2 and having the second polarization state different from the first polarization state can be received (step S120). Then, the planar pattern of the metal layer MT1 located on the surface of the interconnect structure E2 can be determined by differentiating between the light signals reflected from the metal layer MT1 and the light signals reflected from the metal layer MT2 according to intensity differences (step S130).

Figure 8:
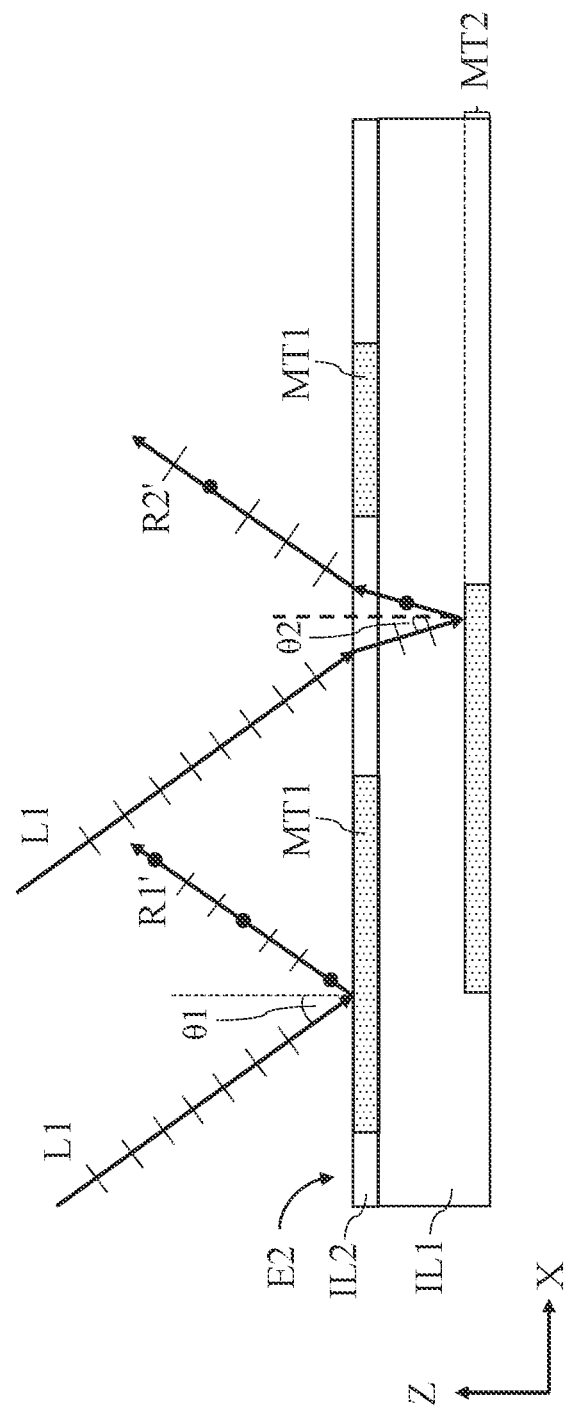
FIG. 8 is a schematic view of how to inspect another interconnect structure with the method of FIG. 1 according to an embodiment of the disclosure.

In some embodiments, since the method M1 is effective in inspecting the planar pattern of the metal layer located on the surface of the interconnect structure, the method M1 can be used to inspect a planar pattern of any new metal layer formed during a process of making multiple metal layers to determine requirement compliance of the planar pattern of the newly formed metal layer and, upon an affirmative determination, continue with the subsequent processes so as to increase the yield of the end product. FIG. 8 is a schematic view of how to inspect another interconnect structure E3 with the method M1 according to an embodiment of the disclosure. In the embodiment illustrated by FIG. 8, the interconnect structure E3 is formed by forming a dielectric layer IL2 on the surface of the interconnect structure E1 and then forming another metal layer MT3 above the dielectric layer IL2. Thus, the metal layer MT3 is located on the surface of the interconnect structure E3 and above the metal layer MT1 and the dielectric layer IL2. In this situation, the method M1 can still used to determine the planar pattern of the metal layer MT3 located on the surface of the interconnect structure E3.

For instance, the surface of the interconnect structure E3 can be illuminated by incident lights L1 having the first polarization state (step S110), and the light signals of parts of the reflecting lights R6 and R7 that are reflected from the metal layer MT1 and the metal layer MT3 and having the second polarization state different from the first polarization state can be received (step S120), and the planar pattern of the metal layer MT3 located on the surface of the interconnect structure E3 can be determined by differentiating between the light signals reflected from the metal layer MT1 and the light signals reflected from the metal layer MT3 according to intensity differences of the light signals (step S130).

Figure 9:
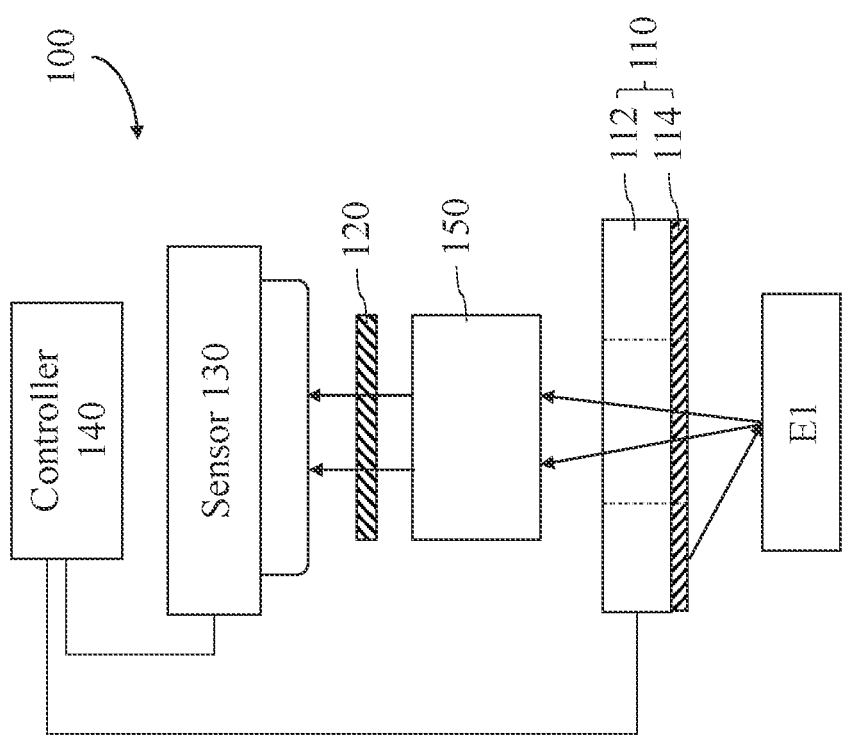
FIG. 9 is a schematic view of a device of inspecting a surface of an interconnect structure according to an embodiment of the disclosure.

FIG. 9 is a schematic view of a device 100 of inspecting a surface of an interconnect structure according to an embodiment of the disclosure. The device 100 comprises a polarization light source 110, an analyzer 120, a sensor 130, and a controller 140. In some embodiments, the device 100 can be configured to execute the steps of the method M1 to determine the planar pattern of the metal layer MT1 on the surface of the interconnect structure E1.

For instance, the polarization light source 110 may execute step S110 to generate incident lights L1 having the first polarization state so as for the incident lights L1 to illuminate the surface of the interconnect structure E1. The analyzer 120 and the sensor 130 may execute step S120; thus, the analyzer 120 may receive reflecting lights R1 and R2 reflected from the interconnect structure E1 and allow a plurality of light signals having the second polarization state different from (for example, but is not limited to, orthogonal to) the first polarization state to pass through, and the sensor 130 may receive the light signals that have penetrated the analyzer 120. Then, the controller 140 may execute step S130, that is, the controller 140 may determine whether the light signals are reflected from the metal layer MT1 or the metal layer MT2 according to the intensity differences of the light signals received by the sensor 130 so as to determine the planar pattern of the metal layer MT1. In some embodiments, the sensor 130 can convert the received light signals into electrical signals related to the light signal intensity, and the electrical signals can be, for example, digital signals indicative of light signal intensity. In such case, the controller 140 may determine the intensity of the light signals received by the sensor 130 according to the electrical signals sent from the sensor 130 so as to perform corresponding determination and computation and to derive the planar pattern of the metal layer MT1, thereby completing step S130.

In some embodiments, the polarization light source 110 comprises a dark-field light source 112 and a polarizer 114. The dark-field light source 112 comprises one or more wavelengths and may mix lights at multiple angles. The polarizer 114 receives the lights generated from the dark-field light source 112 and allows a portion of the lights that have the first polarization state to pass through. As a result, the polarization light source 110 can utilize the dark-field light source 112 and the polarizer 114 to generate the incident lights L1 having the first polarization state to illuminate the interconnect structure E1.

In some embodiments, the device 100 further comprises an objective lens 150. As shown in FIG. 8, the objective lens 150 is disposed between the polarization light source 110 and the analyzer 120. In the present embodiment, the polarization light source 110 has a hollow-cored structure, and the light signals reflected from the interconnect structure E1 can pass through the hollow-cored structure so as to be incident on the objective lens 150, allowing the objective lens 150 to guide the reflected light signals to the analyzer 120. The analyzer 120 is penetrable by the reflecting lights having the second polarization state different from (for example, but is not limited to, orthogonal to) the first polarization state, and thus the sensor 130 can receive the light signals embodied in the reflecting lights and having the second polarization state. In some embodiments, the objective lens 150 comprises at least one lens and can adjust the path of the light signals of the reflecting lights.

In some embodiments, the sensor 130 comprises a photosensitive device, for example, charge-coupled device (CCD) or Complementary Metal Oxide Semiconductor (CMOS) active pixel sensor. In such case, the sensor 130 converts light signals into electrical signals, for example, digital signals, and the controller 140 cab be implemented by an application specific integrated circuit (ASIC) or a general processor for executing software corresponding to the method M1. In some embodiments, when the controller 140 receives the first electrical signals corresponding to a first light signal and the second electrical signals corresponding to a second light signal, the controller 140 determines the intensity of the first light signal and the second light signal according to the first electrical signals and the second electrical signals. When the intensity of the first light signal is greater than the intensity of the second light signal, the controller 140 can determine that the first light signal is reflected from the metal layer MT1 located on the surface of the interconnect structure E1, and can determine that the second light signal is reflected from the metal layer MT2 located inside the interconnect structure E1. Alternatively, when the intensity of the first light signal is greater than the threshold, the controller 140 can determine that the first light signal is reflected from the metal layer MT1. Furthermore, when the intensity of the first light signal is less than the threshold, the controller 140 can determine that the first light signal is reflected from the metal layer MT2. Therefore, even when observed from a top-view angle, a portion of the planar pattern of the metal layer MT2 extends from the planar pattern of the metal layer MT1, the controller 140 can still discern the border between the metal layer MT1 and the metal layer MT2 so as to determine the planar pattern of the metal layer MT1.

In some embodiments, the controller 140 is coupled to the polarization light source 110 and can adjust the wavelength and the angle of incidence of incident lights L1 generated from the polarization light source 110. For instance, the controller 140 may controllably cause the polarization light source 110 to generate light of different wavelengths or light of different angles of incidence, depending on the type of the subject matter of inspection. For example, the controller 140 may controllably cause the polarization light source 110 to generate incident lights of short wavelength during the inspection for copper oxidation defects. In some embodiments, the controller 140 may adjust the angle of incidence of incident lights generated from the polarization light source 110 to illuminate the interconnect structure E1, for example, such that the angle of incidence of the incident lights L1 can be corresponding to the Brewster angle of the air medium and the dielectric layer IL1 so as to increase the difference between the intensity of the light signals reflected from the metal layer MT1 and having the second polarization state and the intensity of the light signals reflected from the metal layer MT2 and having the second polarization state, thereby enhancing the accuracy in determining the planar pattern of the metal layer MT1.

In some embodiments, when the polarization direction of the polarizer 114 and the analyzer 120 change, the difference between the intensity of the light signals reflected from the metal layer MT1 and then passing through the analyzer 120 and the intensity of the light signals reflected from the metal layer MT2 and then passing through the analyzer 120 also changes. Therefore, in some embodiments, after undergoing an experimental test, both the polarizer 114 and the analyzer 120 can be configured to maximize the difference between the intensity of the light signals reflected from the metal layer MT1 and then passing through the analyzer 120 and the intensity of the light signals reflected from the metal layer MT2 and then passing through the analyzer 120 so as for the controller 140 to further enhance the accuracy in determining the planar pattern of the metal layer MT1.

In conclusion, the method and device of inspecting a surface of an interconnect structure, as provided by the embodiments of the disclosure, can let portions of the reflecting lights have a polarization state different from the polarization state of the incident lights by taking the advantage of the depolarization effects of the reflection taking place on a surface metal layer and an inner metal layer of the interconnect structure, and let the light signals that have the second polarization state in the two kinds of reflecting lights have distinguishable intensity differences by providing different reflection environments for these two metal layers, rendering it possible to differentiate between the light signals reflected from the surface metal layer and the light signals reflected from the inner metal layer according to the difference. As a result, the planar pattern of the metal layer located on the surface of the interconnect structure can be determined, and the wrong determinations which might otherwise occur because of the failure to differentiate between the reflecting lights reflected from the surface metal layer and the reflecting lights reflected from the inner metal layer can be reduced.

What is claimed is:

1. A method of inspecting a surface of an interconnect structure, the interconnect structure comprising a first metal layer, a second metal layer, and a dielectric layer enclosing the second metal layer, the first metal layer and the dielectric layer being disposed above the second metal layer, the first metal layer having at least a portion thereof exposed from the surface of the interconnect structure, and the method comprising steps of:

illuminating a surface of an interconnect structure by an incident light having a first polarization state;

receiving a plurality of light signals reflected from the interconnect structure and having a second polarization state different from the first polarization state; and determining a planar pattern of the first metal layer by differentiating between at least one light signal reflected from the first metal layer and at least one light signal reflected from the second metal layer according to intensity differences between the plurality of light signals.

2. The method of claim 1, wherein a polarization direction of the first polarization state is orthogonal to a polarization direction of the second polarization state.

3. The method of claim 1, wherein intensity of the light signal reflected from the first metal layer is greater than intensity of the light signal reflected from the second metal layer.

4. The method of claim 1, further comprising the step of selecting a wavelength of the incident light to maximize a difference between intensity of a first light signal reflected from the first metal layer and having the second polarization state and intensity of a second light signal reflected from the second metal layer and having the second polarization state.

5. The method of claim 1, wherein a polarization direction of the first polarization state is perpendicular to an plane of incidence defined by the incident light and the plurality of light signals, and the incident light is incident at Brewster angle on the interconnect structure to lessen intensity of the incident light entering the dielectric layer.

6. The method of claim 1, wherein the step of determining the planar pattern of the first metal layer by differentiating between the at least one light signal reflected from the first metal layer and the at least one light signal reflected from the second metal layer according to the intensity differences between the plurality of light signals comprises:

when intensity of a first light signal is greater than a threshold, determining that the first light signal is reflected from the first metal layer; or when the intensity of the first light signal is greater than intensity of a second light signal, determining that the first light signal is reflected from the first metal layer, and determining that the second light signal is reflected from the second metal layer.

7. The method of claim 1, wherein a refractive index of the dielectric layer is greater than a refractive index of an environment in contact with the surface of the interconnect structure.

8. The method of claim 1, wherein a depolarization ratio of the first metal layer reflecting a light signal is greater than a depolarization ratio of the second metal layer reflecting a light signal.

9. A device of inspecting a surface of an interconnect structure, the device comprising:

a polarization light source, configured to generate an incident light with a first polarization state so as for the incident light to illuminate a surface of an interconnect structure, wherein the interconnect structure comprises a first metal layer, a second metal layer, and a dielectric layer enclosing the second metal layer, the first metal layer and the dielectric layer are disposed above the second metal layer, and the first metal layer has at least a portion thereof exposed from the surface of the interconnect structure;

an analyzer, configured to receive a reflecting light reflected from the interconnect structure and allow a plurality of light signals having a second polarization state different from the first polarization state to pass through;

a sensor, configured to receive the plurality of light signals; and a controller, coupled to the sensor and configured to differentiate between at least one light signal reflected from the first metal layer and at least one light signal reflected from the second metal layer according to intensity differences of the plurality of light signals so as to determine a planar pattern of the first metal layer.

10. The device of claim 9, wherein a polarization direction of the first polarization state is orthogonal to a polarization direction of the second polarization state.

11. The device of claim 9, wherein the analyzer is configured to maximize a difference between intensity of a first light signal reflected from the first metal layer and then passing through the analyzer and intensity of a second light signal reflected from the second metal layer and then passing through the analyzer.

12. The device of claim 11, wherein intensity of the light signal reflected from the first metal layer is greater than intensity of the light signal reflected from the second metal layer.

13. The device of claim 9, wherein the polarization light source comprises:

a dark-field light source, comprising one or more wavelengths; and a polarizer, configured to receive light generated from the dark-field light source and allow light having the first polarization state to pass through.

14. The device of claim 13, wherein the polarizer is configured to maximize a difference between intensity of a first light signal reflected from the first metal layer and having the second polarization state and intensity of a second light signal reflected from the second metal layer and having the second polarization state.

15. The device of claim 9, wherein a polarization direction of the first polarization state is perpendicular to a plane defined by the incident light and the plurality of light signals, and the device is configured to lessen intensity of the incident light entering the dielectric layer by allowing the incident light to be incident on the interconnect structure at Brewster angle.

16. A method of inspecting a surface of an interconnect structure, the interconnect structure comprising a first metal layer, a second metal layer, and a dielectric layer enclosing the second metal layer, the first metal layer and the dielectric layer being disposed above the second metal layer, the first metal layer having at least a portion thereof exposed from the surface of the interconnect structure, and the method comprising steps of:

adjusting a polarization angle of a polarizer and a polarization angle of an analyzer;

generating an incident light, from a light source through the polarizer, to illuminate the interconnect structure, wherein the incident light has a first polarization state;

receiving a plurality of light signals reflected from the interconnect structure and passing through the analyzer, wherein the plurality of light signals have a second polarization state different from the first polarization state; and differentiating between at least one light signal reflected from the first metal layer and at least one light signal reflected from the second metal layer according to intensity differences of the plurality of light signals so as to determine a planar pattern of the first metal layer.

17. The method of claim 16, wherein the step of differentiating between the at least one light signal reflected from the first metal layer and the at least one light signal reflected from the second metal layer according to the intensity differences of the plurality of light signals so as to determine the planar pattern of the first metal layer comprises:
  when intensity of a first light signal is greater than a threshold, determining that the first light signal is reflected from the first metal layer; or
  when the intensity of the first light signal is greater than intensity of a second light signal, determining that the first light signal is reflected from the first metal layer, and determining that the second light signal is reflected from the second metal layer.

18. The method of claim 16, wherein a polarization direction of the first polarization state is orthogonal to a polarization direction of the second polarization state.

19. The method of claim 16, wherein the step of adjusting the polarization angle of the polarizer and the polarization angle of the analyzer comprises adjusting the polarization angles of the polarizer and the analyzer to maximize a difference between intensity of a first light signal reflected from the first metal layer and then passing through the analyzer and intensity of a second light signal reflected from the second metal layer and then passing through the analyzer.

20. The method of claim 16, wherein a polarization direction of the first polarization state is perpendicular to an plane of incidence defined by the incident light and the plurality of light signals, and the incident light is incident on the interconnect structure at Brewster angle to lessen intensity of the incident light entering the dielectric layer.

* * * * *